US008815009B2

(12) United States Patent
Kyriazis et al.

(10) Patent No.: US 8,815,009 B2
(45) Date of Patent: Aug. 26, 2014

(54) CLAY-BEARING MANUFACTURED SANDS FOR HYDRATABLE CEMENTITIOUS COMPOSITIONS

(75) Inventors: Arthur Kyriazis, Melbourne (AU); Bruce Perry, Reedy Creek (AU); Eric Koehler, Boston, MA (US); Leon Bablouzian, Framingham, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/879,986

(22) PCT Filed: Oct. 17, 2011

(86) PCT No.: PCT/US2011/056585
§ 371 (c)(1),
(2), (4) Date: Jun. 28, 2013

(87) PCT Pub. No.: WO2012/054403
PCT Pub. Date: Apr. 26, 2012

(65) Prior Publication Data
US 2013/0263761 A1 Oct. 10, 2013

Related U.S. Application Data

(60) Provisional application No. 61/394,517, filed on Oct. 19, 2010.

(51) Int. Cl.
*C04B 14/06* (2006.01)
*C04B 20/00* (2006.01)
*C04B 20/02* (2006.01)
*C04B 28/02* (2006.01)
*C04B 40/00* (2006.01)

(52) U.S. Cl.
CPC .............. *C04B 20/023* (2013.01); *C04B 14/06* (2013.01); *C04B 28/02* (2013.01); *C04B 40/0039* (2013.01)
USPC ........... 106/803; 106/482; 106/483; 106/487; 106/719; 106/721; 106/737; 106/808; 106/811; 106/812; 106/816; 106/819; 106/823; 524/2; 524/445

(58) Field of Classification Search
USPC ......... 106/803, 809, 819, 823, 719, 721, 737, 106/811, 812, 816, 482, 483, 487; 524/2, 524/445
See application file for complete search history.

(56) References Cited

U.S. PATENT DOCUMENTS

| 4,471,100 | A | 9/1984 | Hosoido et al. |
| 5,232,497 | A | 8/1993 | Dillenbeck et al. |
| 5,393,343 | A | 2/1995 | Chun et al. |
| 5,668,219 | A | 9/1997 | Polizzoti et al. |
| 6,139,623 | A | 10/2000 | Darwin et al. |
| 6,352,952 | B1 | 3/2002 | Jardine et al. |
| 6,441,054 | B1 | 8/2002 | Ou et al. |
| 6,670,415 | B2 | 12/2003 | Jardine et al. |
| 7,244,694 | B2 | 7/2007 | Fu et al. |
| 2007/0287794 | A1 | 12/2007 | Jacquet et al. |
| 2008/0060556 | A1 | 3/2008 | Jacquet et al. |
| 2009/0071374 | A1 | 3/2009 | Van Deventer et al. |
| 2009/0239771 | A1 | 9/2009 | Federici et al. |
| 2009/0241696 | A1 | 10/2009 | Brocas et al. |
| 2011/0088599 | A1 | 4/2011 | Koyata et al. |

FOREIGN PATENT DOCUMENTS

GB 1328057 A * 8/1973
JP 2006045010 2/2006

OTHER PUBLICATIONS

Form PCT/ISA/210, International Search Report for PCT/US2011/056585, 3 pages, Feb. 29, 2012.
Written Opinion of the International Searching Authority for PCT/US2011/056585, 4 pages, Feb. 29, 2012.

* cited by examiner

*Primary Examiner* — Anthony J Green
(74) *Attorney, Agent, or Firm* — Craig K. Leon

(57) ABSTRACT

The present invention provides a method for making sand compositions wherein manufactured sand particles are pretreated with a clay-mitigating polycation and blended with natural sand particles that have washed to remove fines such that at least 90% of the natural sand particles are retained on a 75 micron sieve. Methods of the invention also involve the use of the blended pretreated sand for making concrete wherein the sand is combined with cement, a polycarboxylate type dispersant, a further amount of clay-mitigating polycation compound, and at least one hydryoxyl or hydroxyl carboxylic acid or salt compound.

8 Claims, 1 Drawing Sheet

CLAY-BEARING MANUFACTURED SANDS FOR HYDRATABLE CEMENTITIOUS COMPOSITIONS

FIELD OF THE INVENTION

This invention relates to the use of manufactured sand in hydratable cementitious compositions, and more particularly to a blend of clay-mitigated manufactured sand and washed natural sand particles having specific sieve sizing, useful for making concrete or mortar compositions, the concrete or mortar having excellent rheology and finishability characteristics.

BACKGROUND OF THE INVENTION

Sand is a fine aggregate material that is combined with hydratable cement to make mortar, and, when crushed gravel is also included, to make concrete. Sand particles usually have a maximum size of 5 mm or less, and may be natural or manufactured.

FIG. 1 is a microphotograph of typical natural sand particles which have been weathered over many years. These sand particles may be derived from glacial, alluvial, or marine deposits, and have a generally spheroidal shape and relatively smooth surface. The shape of natural sand is much more favorable, in contrast to manufactured sand, for controlling rheology in concrete (in terms of water demand) and finishability.

FIG. 2 is a microphotograph of manufactured sand. This type of sand has a vastly different particle morphology and surface texture. The particles have angular morphologies with sharp corners and oblong and/or prolate shapes. Manufactured sand is extracted from the earth and crushed by mechanical equipment, often in multiple stages, giving rise to angular shapes.

The smooth appearance of the natural sand is markedly different from the rough, angular appearance of the manufactured sand. A pile (or plurality of) natural sand particles will tend to flow smoothly in the manner of a fluid; whereas a pile of manufactured sand tends to resist flow.

The use of manufactured sands presents three significant problems in making concrete and making structures out of concrete.

The first significant problem is that the crushing process produces an excessive amount of fines. While natural sand often contains less than 5% of material finer than 75 or 63 micron sieves, manufactured sand usually has 10% to 20% material finer than 75 or 63 microns (prior to washing, if done). Depending on the shape and particle size distribution of these fines, as well as the other ingredients in the concrete mixture, the fines may be beneficial to or harmful for concrete rheology. Further, this increase in fines can cause a decrease in bleeding, or the gradual rising of water to the surface of concrete. In hot, windy, and/or arid climates, the evaporation of water from the surface of concrete must be replaced by water migrating upward from within the concrete; otherwise plastic cracking of the concrete is likely to occur.

The second significant problem is that the manufactured sands may contain deleterious clay minerals. Clays are hydrous aluminumphyllosilicates comprised of tetrahedral and octahedral sheets. The exact natures of the layers and the cations between the layers determine the behavior of the clay. Expansive clays contain exchangeable cations between the layers that can be hydrated, resulting in increased spacing between layers (swelling). In contrast, the layers in non-expansive clay—such as illite, mica, and kaolin—are held closely together. Clays exhibit surface charges and have very fine particle size (typically less than 2 microns). Both expansive and non-expansive clays negatively impact concrete behavior by increasing the amount of water needed for achieving a desired concrete rheology. The effect of non-expansive clays is due mostly to the small particle size, surface charge, and poor particle shape. For instance, mica has a flat, flakey particle shape and can break down upon shear (such as during concrete mixing), resulting in very poor concrete workability. It is believed that expansive clays have a greater influence on concrete rheology than non-expansive clays because they can expand and consume free water from the concrete mixture. In addition, expansive clays are known to impede the performance of polycarboxylate type super-plasticizers. Such polycarboxylate type super-plasticizers are intended to adsorb onto cement particles and to disperse them within an aqueous slurry or paste. Expansive clays interfere with this function and, for the most part, require larger amounts of superplasticizers to be used for attaining a given level of workability in plastic concrete.

The third significant problem is that the washing of excessive fines and clays from sand introduces not only the issue of added costs and disposal, but also gives rise to potential negative effects in concrete or mortar. If the amount of washing is inadequate, some clay will be invariably left in the sand and affect the behavior of polycarboxylate dispersants; but if too much of the fines are washed out, this could result in a deficiency in fines (a certain minimum amount of which is beneficial) which, in turn, adversely affects the rheology of the concrete. Moreover, washing fines does not avoid the above rheology and finishability disadvantages of manufactured sands.

While the foregoing significant problems of manufactured sand may be somewhat rectified by increasing the water or chemical admixtures used in the concrete, these methods could create additional problems. An increase in water content (to improve workability) tends to reduce strength and durability of the concrete. Increasing the amount of cement and/or chemical admixtures could offset this, but this would increase costs without resolving bleeding and finishability problems caused by the use of manufactured sand.

Technologies are available for detecting the level and mitigating the effects of clay contained in the sand aggregates used for making concrete. However, these technologies do not resolve the significant problems created by the use of manufactured sand as described above.

A novel and inventive composition and method are thus needed for treatment of clay-bearing manufactured sand which is intended for use in hydratable cementitious compositions such as concrete. The present invention provides a composition and method for mitigating clay in terms of minimizing its deleterious effects on concrete workability and/or on dosage efficiency of polymer dispersants used in the concrete.

SUMMARY OF THE INVENTION

The present invention helps to address the foregoing problems of using clay-bearing manufactured sand for making concrete and concrete structures.

As used herein, the term "manufactured sand particles" refers to particles having angular shapes (e.g., sharp corners, oblong, and/or prolate) created by mechanical crushing or grinding. On the other hand, the term "natural sand particles" refers to particles having generally spheroidal shape and produced by natural weathering processes.

According to an exemplary embodiment of the invention, manufactured sand particles, which contain clay and which has a methylene blue value of at least 0.5 mg/g., are pretreated by intermixing them with a clay-mitigating polycationic compound (preferably epichlorohydrin dimethylamine (EPIDMA), polydiallyldimethylamine (DADMAC), or mixture thereof) prior to combining the manufactured sand particles with washed natural sand. The term "washed" as used herein means natural sand that has been washed one or more times to remove fines such that at least 90 percent of the natural sand particles by weight are retained on a 75 micron sieve. The blended sand which involves the pretreated manufactured sand and washed sand can then be used for making concrete or mortar by combining the sand composition with hydratable cement, and optionally with coarse aggregate, a polycarboxylate type superplasticizer, and at least one poly-hydroxyl or hydroxyl carboxylic acid or salt thereof (e.g., a gluconate).

An exemplary method of the present invention for making a sand composition for use in hydratable cementitious compositions, thus comprises: (A) providing a plurality of manufactured sand particles having angular shapes and particle sizes whereby 5%-30% (and more preferably 10%-30%) of the plurality of particles passes a 75 micron sieve, the manufactured sand particles further having a clay such that said manufactured sand has a methylene blue value of at least 0.5 mg/g (as determined by known methods, such as, e.g., EN 933-9); and (B) pre-treating the plurality of clay-bearing manufactured sand particles by intermixing them with at least one clay-mitigating polycation compound selected from the group consisting of epichlorohydrin dimethylamine and polydiallyldimethylamine, the clay-mitigating polycation compound being used in an amount of 0.01% to 0.5% based on weight of active polycation compound to weight of treated sand; and (C) blending the pretreated plurality of clay-bearing manufactured sand particles with a plurality of washed natural sand particles having generally spheroidal shapes and wherein the natural sand is washed to remove fines to the extent that at least 90 percent of the natural sand particles by weight are retained on a 75 micron sieve, whereby the ratio of manufactured sand particles to washed natural sand particles are in the range of 10-90:90-10 by weight.

The present invention also pertains to hydratable cementitious compositions comprising a hydratable cement and the sand composition made according to the method described above. Preferred are cementitious compositions having at least one polycarboxylate cement dispersant, and, more preferably, further having at least one poly-hydroxyl or hydroxyl carboxylic acid or salt thereof (e.g., sodium gluconate being most preferred).

The present invention also pertains to methods whereby the aforementioned blend of manufactured and washed natural sand is combined with a hydratable cement, at least one polycarboxylate cement dispersant, and at least one poly-hydroxyl or hydroxyl carboxylic acid or salt thereof.

The above-described methods of the invention are believed to be counter-intuitive in that one might typically think of adding a polycarboxylate superplasticizer in the first instance, or concurrently with the clay-mitigating material, to combat the potential damage to concrete rheology as posed by the manufactured sand. The present inventors believe that pretreatment using the polycation first, before the manufactured sand is combined with natural sand, including clay-bearing natural sand, and used for making concrete, provides flexibility and greater efficacy in resolving the significant problems caused by the use of manufactured sand, and provides a concrete with excellent rheology and finishability characteristics.

Further advantages and features of the invention will be described in further detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein.

DETAILED DESCRIPTION OF EXEMPLARY EMBODIMENTS

Figure 1:
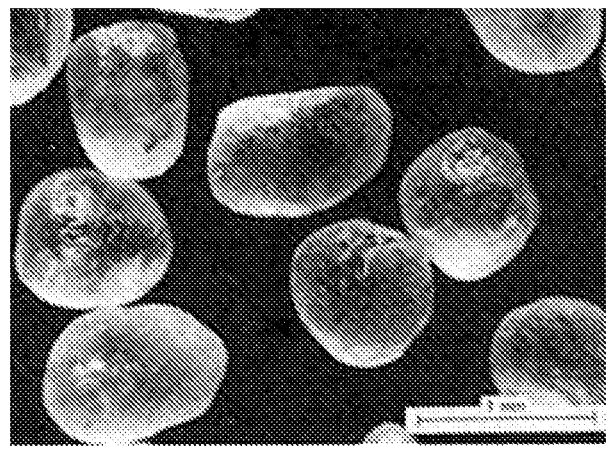
FIG. 1 is a microphotograph of natural sand particles.
Figure 2:
FIG. 2 is a microphotograph of manufactured sand particles.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend.

The term "cementitious" may be used herein to refer to materials that comprise Portland cement or which otherwise function as a binder to hold together fine aggregates (e.g., sand), coarse aggregates (e.g., crushed gravel), or mixtures thereof, in concrete and mortar.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

The term "concrete" will be used herein generally to refer to hydratable cementitious mixtures comprising cement, sand, usually a coarse aggregate such as crushed stone or gravel, and optionally a chemical admixture or admixtures (e.g., such as polycarboxylate cement dispersant).

The term "workability" describes the relative ease with which concrete is mixed, handled, and placed. Whereas nearly all mix ingredients affect workability, it is common to adjust the water content to increase or decrease workability. Thus, a concrete requiring more water to reach a given workability, is said to have higher "water demand". Concrete workability is most commonly measured in terms of the slump test, wherein concrete is placed in a mold in the shape of a frustum of a cone. The mold is removed and the vertical distance the concrete subsides is measured as the slump.

The term "rheology" means and refers to the scientific study of the flow of materials. In particular, rheology herein is used to describe the workability of concrete or mortar.

The term "finishability" refers to the ease with which the final surface finish is applied (for example, the smooth finish of a floor). Finishing tasks include screeding, floating, and troweling.

The definitions of manufactured sand and natural sand were previously provided in the background and are incorporated herein as well.

Manufactured sands are commonly available in the industry and commercially available from Heidelberg-Hanson, Boral Industries, Holcim, Wagner, and other suppliers. Crushers are typically used for reducing the size of large aggregates into sand particles of the size typically used in construction materials.

The methylene blue values of manufactured sand may be determined by mixing a known quantity of methylene blue dye with a known quantity of sand. The methylene blue dye is adsorbed onto the clay surface. The amount of methylene blue dye consumed by the clay is expressed as amount of methylene blue per amount of sand (for example, mg of methylene blue dye per g of sand). Various methods are available for determining the methylene blue value. For instance, both EN 933-9 and AASHTO T330 use titration to determine the amount of methylene blue adsorbed by the clay. Other methods add an amount of methylene blue dye in excess of the amount that will be consumed by the clay, then measure the change in concentration of methylene blue dye in solution to determine the amount consumed by the clay.

Natural sand particles may be washed by a variety of methods. For example, augur-driven devices are used for allowing heaver and larger particles to be separated from finer particles which are washed out. Hydrocyclones employ the cyclonic effect of pressurized water within a funnel to separate the larger, heaver particles while smaller, lighter particles are removed by skimming. Sand may also be washed using sand classifiers which resemble rectangular boxes across which the sand is flowed with water, creating a particle size gradient whereby heaver, larger particles settle out more quickly and various sizes of particles can be removed selectively through holes at the bottom of the rectangular box. Hence, the natural sand particles contemplated for use in the present invention will be subjected to one of the foregoing washing methods at least once to remove the finer particles, such that at least 90% of the washed natural sand particles by weight will be retained on a 75 micron sieve.

As previously summarized above, an exemplary method of the present invention for making a sand composition for use in hydratable cementitious compositions, comprises:

(A) providing a plurality of manufactured sand particles having angular shapes and particle sizes whereby 5%-30% (and more preferably 10%-30%) of the plurality of particles passes a 75 micron sieve, the manufactured sand particles further having a clay such that said manufactured sand has a methylene blue value of at least 0.5 mg/g (as determined by known methods, such as, e.g., EN 933-9);

(B) pre-treating the plurality of clay-bearing manufactured sand particles by intermixing them with at least one clay-mitigating polycation compound selected from the group consisting of epichlorohydrin dimethylamine and polydiallyldimethylamine, the clay-mitigating polycation compound being used in an amount of 0.01% to 0.5% based on weight of active polycation compound to weight of treated sand; and (C) blending the pretreated plurality of clay-bearing manufactured sand particles with a plurality of washed natural sand particles having generally spheroidal shapes and wherein the natural sand is washed to remove fines to the extent that at least 90 percent of the natural sand particles by weight are retained on a 75 micron sieve, whereby the ratio of manufactured sand particles to washed natural sand particles are in the range of 10-90:90-10 by weight.

The pretreatment of the manufactured clay-bearing sand particles, which involves pretreating the clay using the clay-mitigating polycation compound, the washing of the natural sand to remove fines such that at least 90% of the washed natural sand particles are retained on a 75 micron sieve, and the blending of the pretreated manufactured sand with the washed natural sand can be accomplished at the aggregate manufacturing facility, which is typically located at a quarry or mine.

The blended sand composition will then be taken to a concrete plant where the sand will be combined with hydratable cement to make concrete or mortar. In further exemplary methods of the invention, accordingly, the blended sand composition is combined with cement and optionally with polycarboxylate type cement dispersants (superplasticizers), the clay-mitigating polycation compound, and at least one poly-hydroxyl or hydroxyl carboxylate compound.

Conventional polycarboxylate type cement dispersants are known and contemplated for use in the present invention. Such polycarboxylate cement dispersants are also referred to as plasticizers or superplasticizers for concrete, and, in addition to their carboxylate/carboxylic acid groups, otherwise may be referred to with respect to their oxyalkylene groups, such as "EO/PO" (e.g., ethylene oxide and/or propylene oxide) polymer-containing plasticizers. Hence, the cement dispersants contemplated for use in the present invention includes EO/PO polymers and EO/PO comb polymers, as described for example in U.S. Pat. Nos. 6,352,952 B1 and 6,670,415 B2 of Jardine et al., which mentioned the polymers taught in U.S. Pat. No. 5,393,343 assigned to W. R. Grace & Co.-Conn. These polymers are available from Grace under the trade name "ADVA®". Another exemplary cement dispersant polymer, also containing EO/PO groups, is obtained by polymerization of maleic anhydride and an ethylenically-polymerizable polyalkylene, as taught n U.S. Pat. No. 4,471,100. The amount of such polycarboxylate cement dispersants as used within concrete compositions may be in accordance with conventional use (e.g., 0.05% to 0.25% based on weight of active polymer to weight of cementitious material).

Exemplary clay-mitigating agents which can be used for pretreating the manufactured sand, as well as for addition into the concrete or mortar, includes polycation compounds such as epichlorohydrin-dimethylamine (EPI-DMA), which is commercially available from SNF under trade name designation "FL" such as FL-2250 and FL-2340, and also such as diallyldimethylamine ammonium chloride (DADMAC), which also is commercially available from SNF (e.g., such as under the trade name FL-4440).

An exemplary poly-hydroxyl or hydroxyl carboxylate compound contemplated for use in the invention can be selected from the group consisting of aldonic acids and salts thereof, such as gluconate, other sugar acids and salts thereof, such as citric acid, lactic acid, tartaric acid, and polyols, such as sorbitol, xylitol, lactitol, maltitol and glycerol, or mixtures thereof. Gluconates are preferred, and this includes sodium gluconate in particular. The amount of such compound may be, for example, 0.1 to 1000 parts per million (ppm), and more preferably 1-500 ppm, based on total weight of sand.

Other conventional admixtures can be used for making concrete and mortar using the sand composition of the invention. For example, other cement dispersants can be used with the polycarboxylate type dispersant, and other clay-mitigating materials can be used with the polycation compounds identified herein, including without limitation amines, glycols, sugars, fibers, and other conventional admixtures and admixture combinations.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

EXAMPLE 1

Lab concrete mixtures were batched with 255 kg/m³ of cement, 90 kg/m³ of fly ash, 1015 kg/m³ of stone, and 850 kg/m³ of sand. The sand consisted of a blend of a washed natural sand, washed manufactured sand, and unwashed manufactured sand (methylene blue value of 2.62 mg/g, 13% passing the 75 micron sieve). A concrete admixture containing 4.9% actives polycarboxylate-based dispersant polymer and 28.8% actives sodium gluconate was added at a rate of 1035 ml/m³. The ratio of water to cementitious materials (w/cm) was held constant at 0.55.

The results are shown in Table 1. Increasing the manufactured sand content in mix 2 resulted in a reduction in slump and reduction in bleeding in comparison to mix 1. For the third mix, aggregate treatment chemical consisting of a 50% actives solution of epichlorohydrin dimethylamine was pre-treated directly to the unwashed manufactured sand prior to blending with the other sands and prior to introduction of the other mix ingredients (cement, stone, fly ash, water, admixture). The addition rate was 0.33% of active epichlorohydrin dimethylamine per unwashed manufactured sand mass. The introduction of epichlorohydrin dimethylamine, in a concrete mix containing polycarboxylate-based polymer and sodium gluconate, resulted in an increase in slump (reduced water demand) and an increase in bleeding.

TABLE 1

|  | Mix 1 | Mix 2 | Mix 3 |
| --- | --- | --- | --- |
| Unwashed Manufactured Sand, % | 20 | 40 | 40 |
| Washed Manufactured Sand, % | 10 | 10 | 10 |
| Washed Natural Sand, % | 70 | 50 | 50 |
| Aggregate Treatment Chemical, % | 0 | 0 | 0.33% |
| Water/Cementitious Ratio | 0.55 | 0.55 | 0.55 |
| Slump, mm | 90 | 80 | 140 |
| Bleeding, g per 8 kg concrete | 25.3 | 19.1 | 27.8 |
| 7-Day Compressive Strength, Mpa | 30.2 | 31.6 | 32.2 |

The foregoing example and embodiments were present for illustrative purposes only and not intended to limit the scope of the invention.

It is claimed:

1. Method for making a sand composition for use in hydratable cementitious compositions, comprising
   (A) providing a plurality of manufactured sand particles having angular shapes and particle sizes whereby 5%-30% of said plurality of particles passes a 75 micron sieve, said manufactured sand particles bearing clay such that said clay-bearing manufactured sand has a methylene blue value of at least 0.5 mg/g; and
   (B) pre-treating said plurality of clay-bearing manufactured sand particles by intermixing them with at least one clay-mitigating polycation compound selected from the group consisting of epichlorohydrin dimethylamine and polydiallyldimethylamine, said clay-mitigating polycation compound being used in an amount of 0.01% to 0.5% based on weight of active polycation compound to weight of sand the clay-bearing manufactured sand particles being pretreated; and
   (C) blending the pretreated plurality of clay-bearing manufactured sand particles with a plurality of washed natural sand particles having generally spheroidal shapes and wherein the natural sand is washed to remove fines to the extent that at least 90 percent of the natural sand particles by weight are retained on a 75 micron sieve, whereby the ratio of the manufactured sand particles to the washed natural sand particles are in the range of 10-90:90-10.

2. The method of claim 1 wherein, in providing said plurality of manufactured sand particles, said particles have a particle size whereby 10% to 30% of said plurality of particles passes a 75 micron sieve.

3. A hydratable cementitious composition comprising a hydratable cement and a sand composition made according to claim 1.

4. A hydratable cementitious composition comprising a hydratable cement, at least one polycarboxylate cement dispersant, and a sand composition made according to claim 1.

5. A hydratable cementitious composition comprising a hydratable cement; at least one polycarboxylate cement dispersant; at least one poly-hydroxyl or hydroxyl carboxylic acid or salt thereof; and a sand composition made according to claim 1.

6. A hydratable cementitious composition of claim 5 wherein said at least one poly-hydroxyl or hydroxyl carboxylic acid or salt thereof is a gluconate.

7. Method for mitigating clay-bearing aggregate in a concrete composition, comprising: combining a hydratable cement, at least one polycarboxylate cement dispersant, and at least one poly-hydroxyl or hydroxyl carboxylic acid or salt thereof, with a sand composition made in accordance with claim 1.

8. Method of claim 1 wherein the manufactured sand particles have angular shapes from being crushed by mechanical equipment and the natural sand particles have shapes which are generally more spheroidal and smoother than the angular shapes of the manufactured sand particles.

* * * * *